(12) United States Patent
Zepf

(10) Patent No.: US 9,750,262 B2
(45) Date of Patent: Sep. 5, 2017

(54) ROLLING, FOLDING AND FORMING DEVICE

(71) Applicant: Dipsums LLC, Palm Harbor, FL (US)

(72) Inventor: Peter Lawrence Zepf, Tiverton (CA)

(73) Assignee: DIPSUMS LLC, Palm Harbor, FL (US)

( * ) Notice: Subject to any disclaimer, the term of this patent is extended or adjusted under 35 U.S.C. 154(b) by 0 days.

(21) Appl. No.: 14/891,270

(22) PCT Filed: May 29, 2015

(86) PCT No.: PCT/US2015/033106
§ 371 (c)(1),
(2) Date: Nov. 13, 2015

(87) PCT Pub. No.: WO2015/184218
PCT Pub. Date: Dec. 3, 2015

(65) Prior Publication Data
US 2016/0174578 A1 Jun. 23, 2016

Related U.S. Application Data

(60) Provisional application No. 62/004,829, filed on May 29, 2014.

(51) Int. Cl.
| A21C 11/10 | (2006.01) |
| A21C 9/08 | (2006.01) |
| A21C 9/00 | (2006.01) |
| A23P 30/00 | (2016.01) |
| A21C 3/06 | (2006.01) |
| A21C 3/02 | (2006.01) |

(52) U.S. Cl.
CPC ............... *A21C 11/10* (2013.01); *A21C 9/00* (2013.01); *A21C 9/088* (2013.01); *A23P 30/00* (2016.08); *A21C 3/022* (2013.01); *A21C 3/06* (2013.01)

(58) Field of Classification Search
CPC .. A21C 3/022; A21C 3/06; A21C 7/01; A21C 9/088; A21C 11/10; A23P 30/00
USPC ........................................ 425/112, 324.1, 383
See application file for complete search history.

(56) References Cited

U.S. PATENT DOCUMENTS

| 3,439,632 A | 4/1969 | Pirotsky |
| 3,763,764 A | 10/1973 | Schy |
| 3,912,433 A * | 10/1975 | Ma .......................... A21C 9/04 |
| | | 425/126.1 |

(Continued)

FOREIGN PATENT DOCUMENTS

NL       9201653 A  *  4/1994    ............. A21C 9/063

OTHER PUBLICATIONS

English Abstract for NL 9201653, Q. T. Tran, "Method and assembly for producing a food product which comprises a filling wound inside a casing", published on Apr. 18, 1994.*

*Primary Examiner* — Seyed Masoud Malekzadeh
(74) *Attorney, Agent, or Firm* — Christopher Paradies; Paradies Law P.A.

(57) ABSTRACT

A machine comprises at lease one pair of cylindrical extensions coupled to gears driven by a rotating shaft for opening the extensions for insertion of a flat blank and closing the cylindrical extensions onto the flat blank. The flat blank is folded and rolled. A second set of gears, operated by a rotating shaft, crimps, at least partially fries, cuts and directs finished products to the next step in processing and packaging.

13 Claims, 16 Drawing Sheets

(56) References Cited

U.S. PATENT DOCUMENTS 4,154,153 A 5/1979 Stickle
4,439,124 A 3/1984 Watanabe

\* cited by examiner

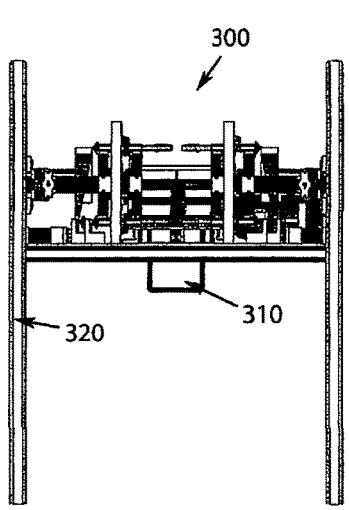
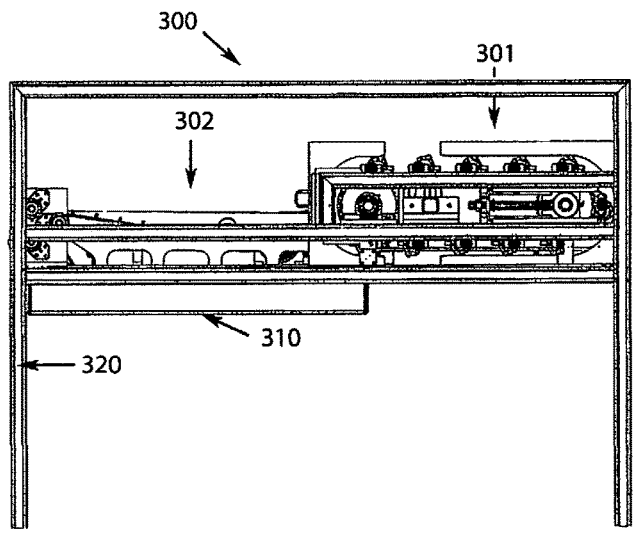
FIG. 8
FIG. 11
FIG. 10
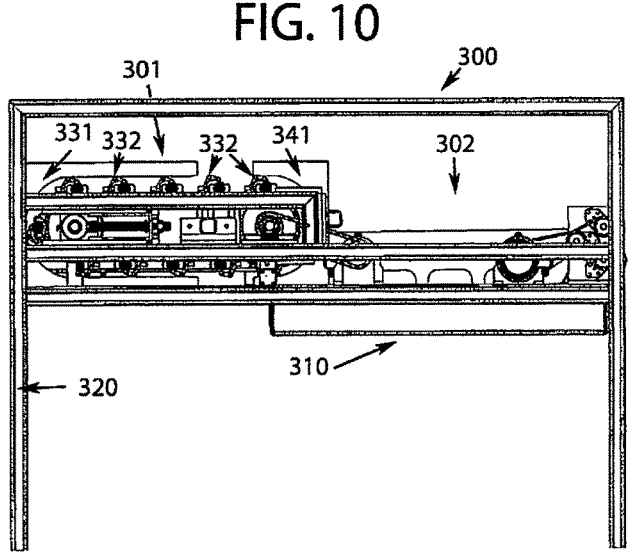
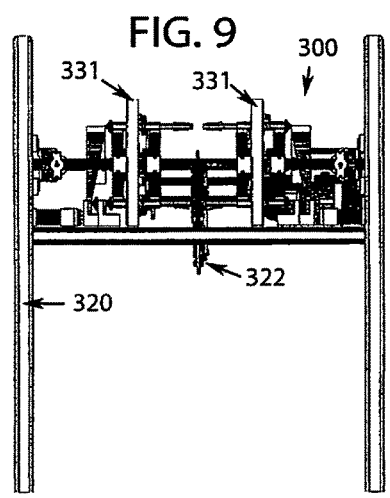
FIG. 9

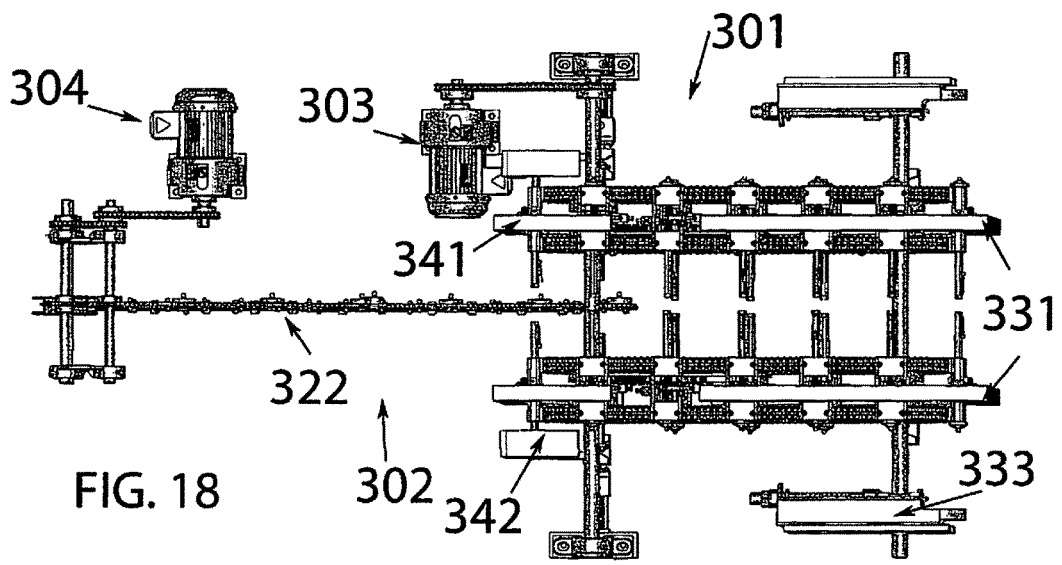
FIG. 18
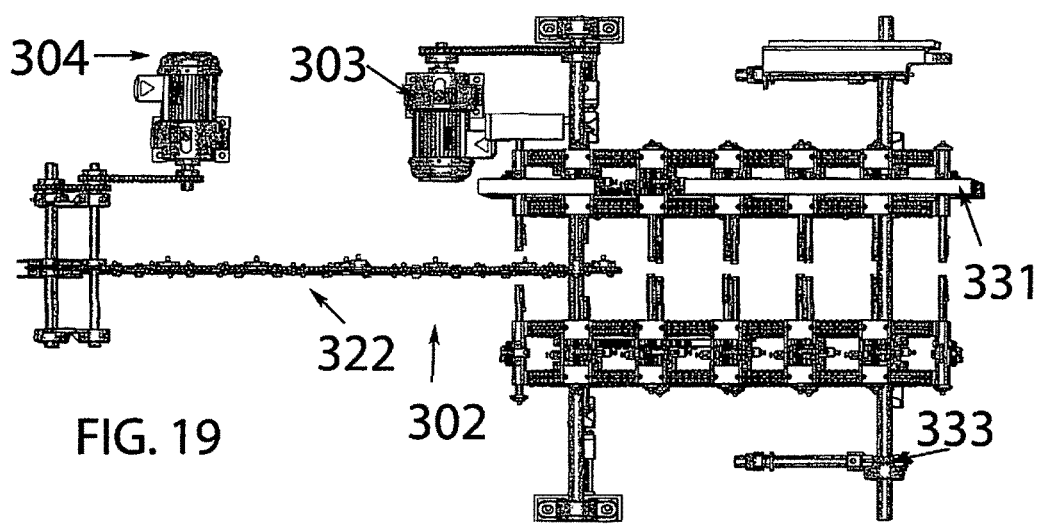
FIG. 19
FIG. 20
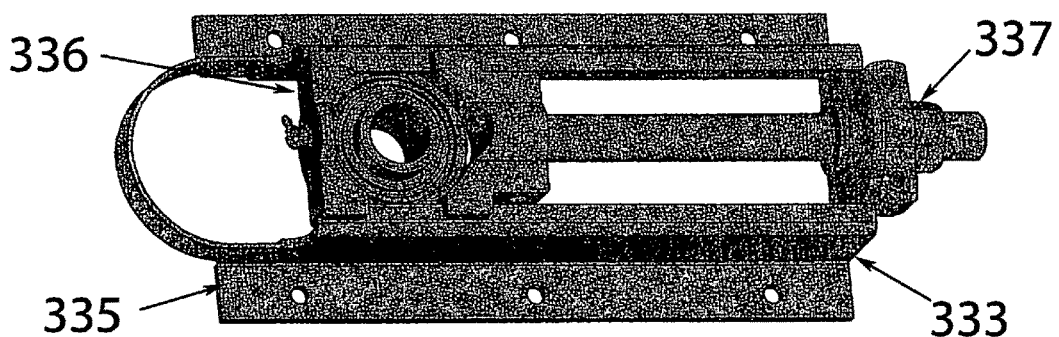

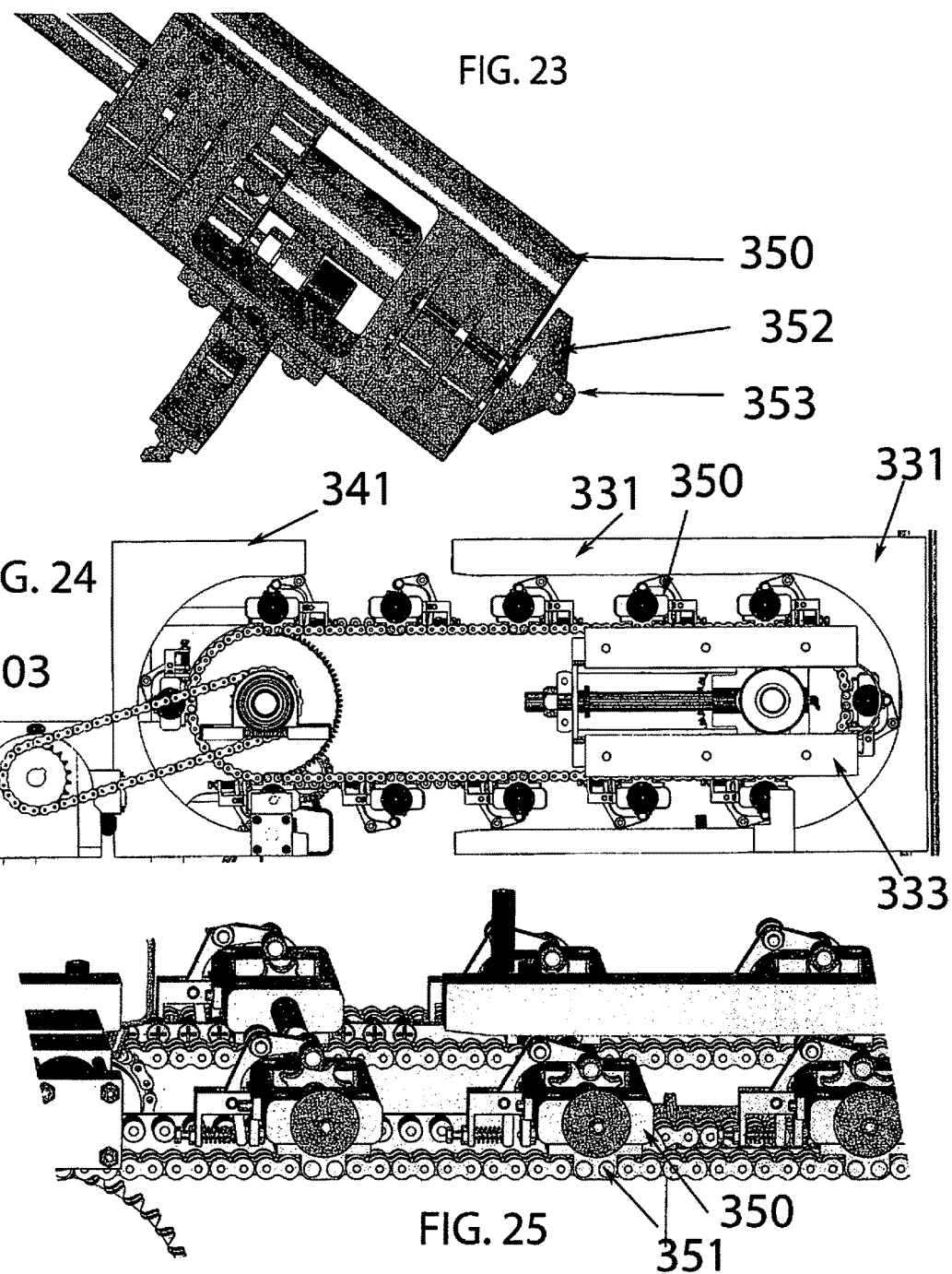

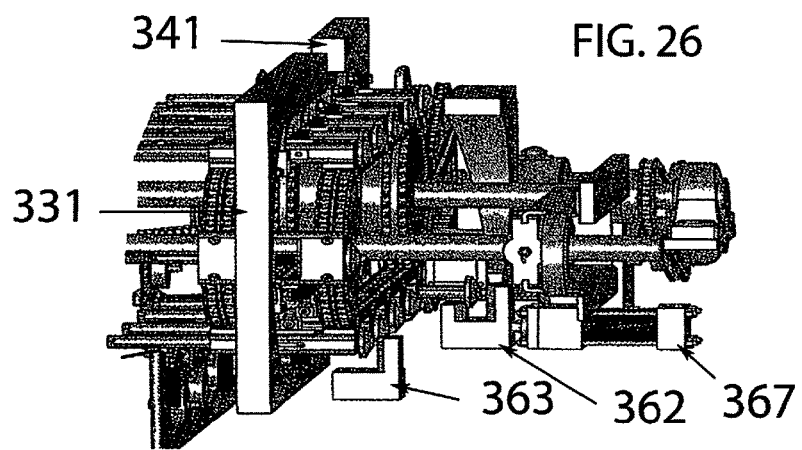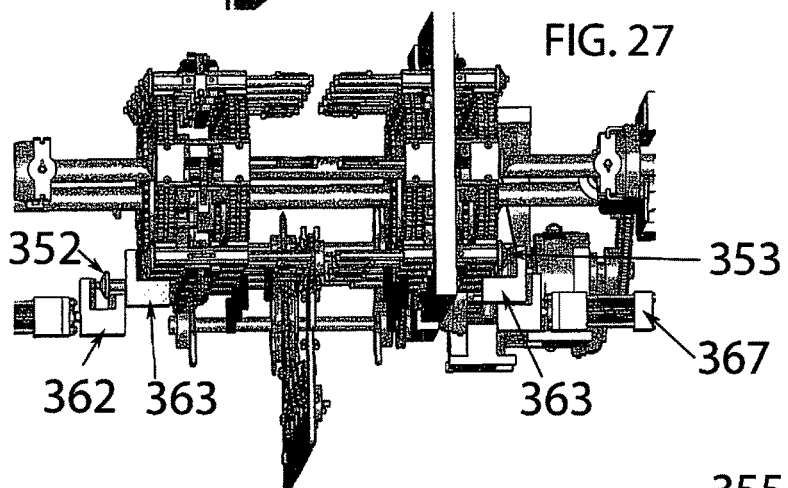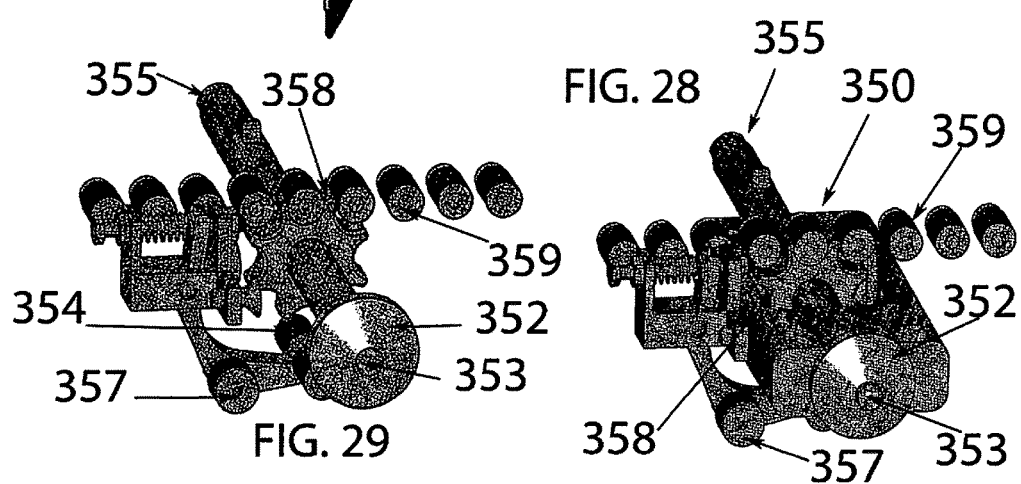

ROLLING, FOLDING AND FORMING DEVICE

CROSS RELATED APPLICATIONS

This application claims priority to U.S. Prov. Appl. 62/004,829, which was filed May 29, 2014.

FIELD OF THE INVENTION

The field relates to machines for automatic rolling, folding and forming of confections.

BACKGROUND

Devices for folding confections are known in the art. However, machines that are capable of rolling, folding and forming a confection are not known. In particular, a machine that uses cylindrical extensions that open and close to engage a confection blank and then roll and fold the confection are not known.

Hand rolling and forming is used for many processes due to the complexity of building machines to do this type of work, but hand rolling and forming is time consuming and can lead to repetitive stress disorders.

SUMMARY

A machine for automatically folding, rolling and forming a product from a flat blank to a rolled and formed product, comprises a first stage comprised of a pair of extension devices, each of the extension devices having a gripping member and an elongated extension, the gripping member and the extension being arranged such that a portion of the blank is gripped between the gripping member and the extension, and a distal end of one of the pair of extensions opposes a distal end of the other of the pair of extensions, such that the pair of extensions grip opposite portions of the blank; and a drive, the drive comprising a mechanism for opening and closing the gripping member in relation to the extension and a belt or chain, the pair of extension devices being coupled to the belt or chain, such that the extension device cycles from a starting position to a finishing position and returns again to the starting position, wherein the drive includes at least one guide arranged to retract at least a portion of the extension from the rolled and formed product, releasing the rolled and formed product for further processing, and the drive includes a rotary drive, the rotary drive engaging the pair of extensions during a portion of the cycle, such that the pair of extensions roll up the blank. In one example, the second stage comprises a crimping device that engages the rolled and formed product and crimps a portion of the product, the crimped portion being secured while the product is fed into a cooker, the cooker supplying heat to at least partially cook the product before exiting the cooker, such that the product substantially retains its shape and is crimped. For example, the second stage may further comprise a cutter, the cutter being arranged such that the product is divided into two products after crimping, such as along the crimped portion. A rotating shaft may drive the crimper and the cutter. The second stage may further comprise an ejector, wherein the ejector pushes the two products from the second stage to a subsequent stage for further processing or packaging. The drive may comprise a rotating shaft that drives gears, and the gears may be coupled with a chain. The extension device may be attached to the chain, such that the chain carries the extension device through the cycle. Each of the pair of extension devices may comprise a flange coupled to the respective extension, such that the guide engages a respective one of a pair of flange. Then, the flanges retract the pair of extensions from the product. An undulating plate opposes the chain on an opposite side of the crimped portion of the product, such that the product lowers and rises in an undulating way through the pan, such as a frying pan with hot frying oil. The mechanism for opening and closing the gripping member in relation to the extension may comprise a push rod and a lever arm, wherein the gripping member is fixedly coupled to the lever arm, such that when the push rod pushes a portion of the lever arm, the lever arm pivots about a pivot point, opening the gripping member in relation to the extension. In one example, the push rod extends through the flange and extends beyond the flange, and the at least one guide engages each of the respective push rods of the pair of extension devices, such that the respective gripping member opens in relation to the respective extension, before the gripping member grips the blank and before the pair of extensions retract from the rolled product.

A method of folding, rolling and forming a product from a flat blank to a rolled and formed product may use the one of the machines, previously described by opening the gripping member of each of the pair of extension devices; disposing the pair of extension devices on opposite sides of the blank; gripping opposite sides of the blank by closing the gripping member; folding at least a portion of the blank over onto itself; rotating the extension and rolling the blank, and forming a rolled product. For example, a step of crimping along a center portion between the pair of extensions may be used to crimp the product. The method may comprise dipping the crimped blank in a pan of hot oil, at least partially cooking the blank, and may include raising and lowering the crimped blank in an undulating pattern of highs and lows, while remaining submersed in the oil. Optionally, a step of cutting the crimped blank where the crimped blank is crimped may be added, dividing the crimped blank into two products.

A machine for rolling, folding and forming of a product comprises a first stage including gears coupled to one or more rotating shafts and cams or guides that operate at least one pair of opposing extensions, such as sticks, rods or cylindrical extensions. A shaped blank is placed on a plate, by hand or automatically, as is known in the art, then the extensions engage, fold, roll and deliver a formed product to an optional second stage. The second stage may be activated by a rotating shaft, which may be the same rotating shaft that drives the first stage or a different rotating shaft, for example.

For example, a flat confection blank may be placed on the plate. Cylindrical extensions are coupled with gearing, such that clips open and engage a portion of the blank between the cylindrical extensions and a respective clip, folding the blank, rolling the blank and delivering the blank to be crimped, fried, cut into two halfs and delivered by the second stage to a subsequent stage for processing and packaging. For example, processing may include seasoning, additional cooking, cooling, inspection, distribution to packages, package sealing, boxing, crating and distribution of completed packages to storage or delivery to wholesale or retail.

In one example, a first stage or a second stage will include cylindrical extensions having pins that move away from each other, allowing the blank to be placed on the plate, with the two cylindrical extensions being on opposite sides of the plate. Then, the pins move toward each other, while a gripping device, such as a clip, opens. The plate may have cut-outs on opposite sides of the plate or a slot to accommodate the engagement of the gripping devices of the cylindrical extensions on a portion of the blanks. As the pins move toward each other, opposite sides of the blank are inserted between respective gripping device and cylindrical extension, and the gripping device gently closes on the blank. After the two cylindrical extensions reach their nearest point, a gear attached to the cylindrical extension engages roll bars on a roll bar assembly, while the cylindrical extensions are moved forward above the plate. The gears of the two cylindrical extensions contact the roll bars and rotate the two cylindrical extensions as the cylindrical extensions are moved forward by gearing of the machine. By moving forward and rotating at the same time, the cylindrical extensions may roll up the blank. As the cylindrical extensions form the blank and deliver the blank to the second stage, cam or guide following structures may cause the gripping devices to open and the cylindrical extensions to withdraw from the rolled up blanks, while feeding the blanks into the second stage.

In one example, the first stage is operated by an electric motor rotating a shaft. Alternatively, the rotating shaft may be operated by a hand crank. In one example, the second stage is operated by a second shaft, driven by a second motor. The second motor and the first motor may be synchronized by sensors monitoring the progress of blanks proceeding through the first stage. Alternatively, the first stage and the second stage may be operated by a common rotating shaft.

In one example, the blank is rolled up and is fed into a crimping device, such that a rolled up confection is folded and formed. The confection may be fed into a tray for hot liquid for blanching, such that the confection retains its form after exiting from the machine. Then, the confection may exit the machine and may be further processed, such as by deep frying or baking, as is known in the art.

In one example, the confection is transferred from the cylindrical extensions to a crimping device by extracting the cylindrical extension outwardly after the confection is brought to the crimping device. Then, rotating fingers, coupled to the machines gearing, engage the confection and move it through the crimping device. In one example, two different sets of fingers are used to move the confection through the crimping device and a curing step. During the curing step, for example, the confection may be dipped in a hot liquid, such as boiling water or oil.

In one example, a machine comprises a pair of cylindrical extensions coupled to a first set of gears driven by a rotating shaft for opening the extensions for insertion of a flat blank and closing the cylindrical extensions onto the flat blank. A second set of gears, operated by the same rotating shaft, starts to moved the extensions forward, only after the extensions close onto the blank. A third set of gearing comprising elongated roller bars rotate the extensions, rolling up the blank and folding it onto itself. In one example, another set of gears rotate fingers that engage the rolled up blank and feed it through a forming device, such as device for crimping the blank.

In another example, a plurality of pairs of cylindrical extensions increase the productivity of the machine, such as 12 pairs of cylindrical extensions, in one example.

For example a folding and rolling device may be comprised of a housing that is mounted to a belt or chain drive, the belt or chain drive being driven by a gear engaging a belt or chain or a plurality of belts and chains. For example, the housing may be mounted directly to a chain or a plurality of chains. The cylindrical extension may extend through the housing, a distal end of the cylindrical extension extending from the housing and having a mechanism that engages a blank for folding and rolling the blank. In one example, a gripping mechanism is pivotally attached to a surface of the distal end, such that the gripping mechanism may be opened and closed during operation of the device. Opposite of the distal end, an opposite end may extend from an opposite side of the housing, such that, when the opposite end of the cylindrical extension engages a guide disposed at a position in the machine, the opposite end pushes a lever that pivots the pivotally attached gripping mechanism, opening the gripping mechanism. A biasing mechanism may be included within the cylindrical extension, such that when the opposite end is not pushed, then the spring returns the gripping mechanism to a closed position. For example, a gripping mechanism may be a clip or an elongated member that captures and retains a portion of the blank between a cylindrical shell and the clip or elongated member.

In one example, the opposite end has a shaped flange, and the push rod extends through the shaped flange, such that a first end of the push rod engages the a portion of the guide or guides for opening of the gripping mechanism. The shaped flange may be engaged by another portion of the guide, such that the shaped flange is pulled through a channel formed in the guide. The shaped flange may be attached to the cylindrical shell, which extends through the housing, forming an exterior surface of the cylindrical extension. Thus, when the shaped flange is pulled into the channel formed in the guide, the cylindrical extension may be retracted, outwardly from the blank, releasing the blank from the grip of the device. Alternatively, a linear actuator may be used to retract the cylindrical extension from the blank, either during engagement with the blank or after the blank is formed and before the blank is fully crimped and fed through a second stage of the machine.

In one example, a rocker arm assembly is spring actuated and includes a guide follower, such that a rocker arm guide may engage the guide follower to fix the alignment of the gripping member with the blank, along a portion of a cyclical path of the cylindrical member. During another portion of the cyclical path, a gear may be attached to the cylindrical extension, and the gear may be operatively engaged such the gear rotates the cylindrical extension about its longitudinal cylindrical axis of rotation. Rotation of the cylindrical extension may roll up the blank, for example. In this way, the orientation of the gripping member may be aligned for operatively engaging and disengaging the blank.

BRIEF DESCRIPTION OF THE DRAWINGS

The following drawings are illustrative examples and do not further limit any claims that may eventually issue.

FIG. 8 illustrates one end view of an example of a machine having a plurality of pairs of cylindrical extensions for increased productivity.

FIG. 9 illustrates an opposite end of the machine of FIG. 8.

FIG. 10 illustrates a side view of the machine of FIGS. 8 and 9.

FIG. 11 illustrates the opposite side view off the machine in FIG. 10.

FIG. 18 illustrates a top view of a machine with some hidden structures removed to show another view of the drive mechanisms.

FIG. 19 illustrates the same view as FIG. 18 without a cover on a chain tensioning mechanism.

FIG. 20 illustrates a detail view of the chain tightening mechanism of FIG. 19.

FIG. 23 illustrates a partial detail view of a cylindrical extension device.

FIG. 24 illustrates a side plan view of a first stage of a machine having 12 pairs of cylindrical extension devices.

FIG. 25 illustrates a detail view showing attachment of one of cylindrical extension devices.

FIG. 26 illustrates a detail view of one-half of the first stage showing guides engaging cylindrical extension devices.

FIG. 27 illustrates another detail view of all 12 pairs of the cylindrical extension devices.

FIGS. 28-35 illustrate various views with various structures hidden for explaining the operation of one example of a cylindrical extension device.

When the same reference characters are used, these labels refer to similar parts in the examples illustrated in the drawings.

DETAILED DESCRIPTION

Figure 6:
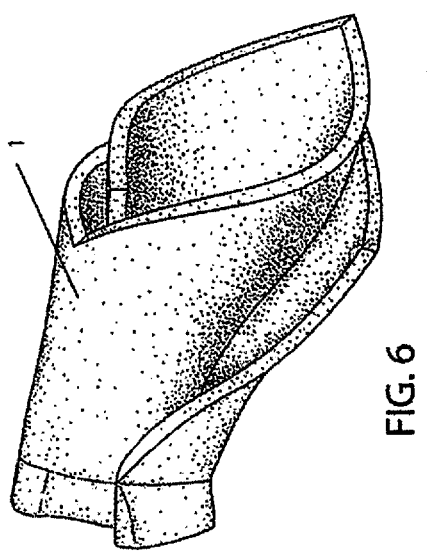
FIG. 6 illustrates a confection as folded and formed by the machine of FIG. 1.
Figure 7:
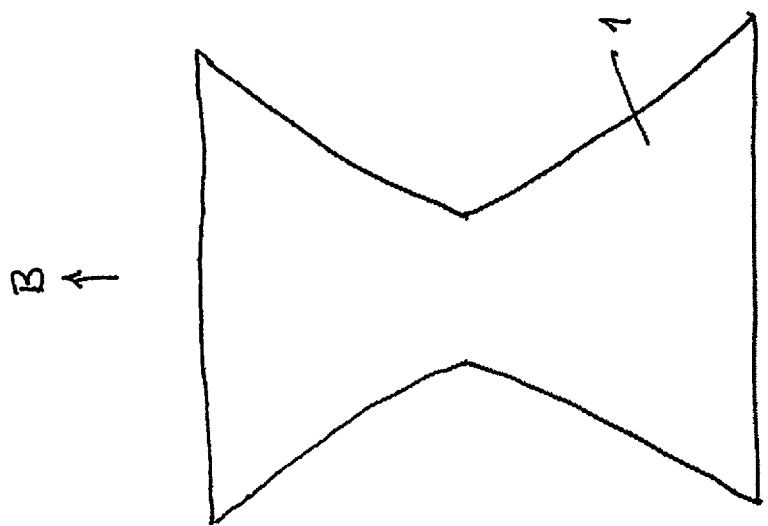
FIG. 7 illustrates a top view of a confection blank.

A new type of confection may be rolled, folded and formed by a machine comprising gearing capable of engaging opposite sides of a flat confection blank 1, as illustrated in FIG. 7, for example. The flat confection blank 1 may be rolled up, folded over on itself and formed into two finished confections, such as the chip in FIG. 6, for example.

Figure 1:
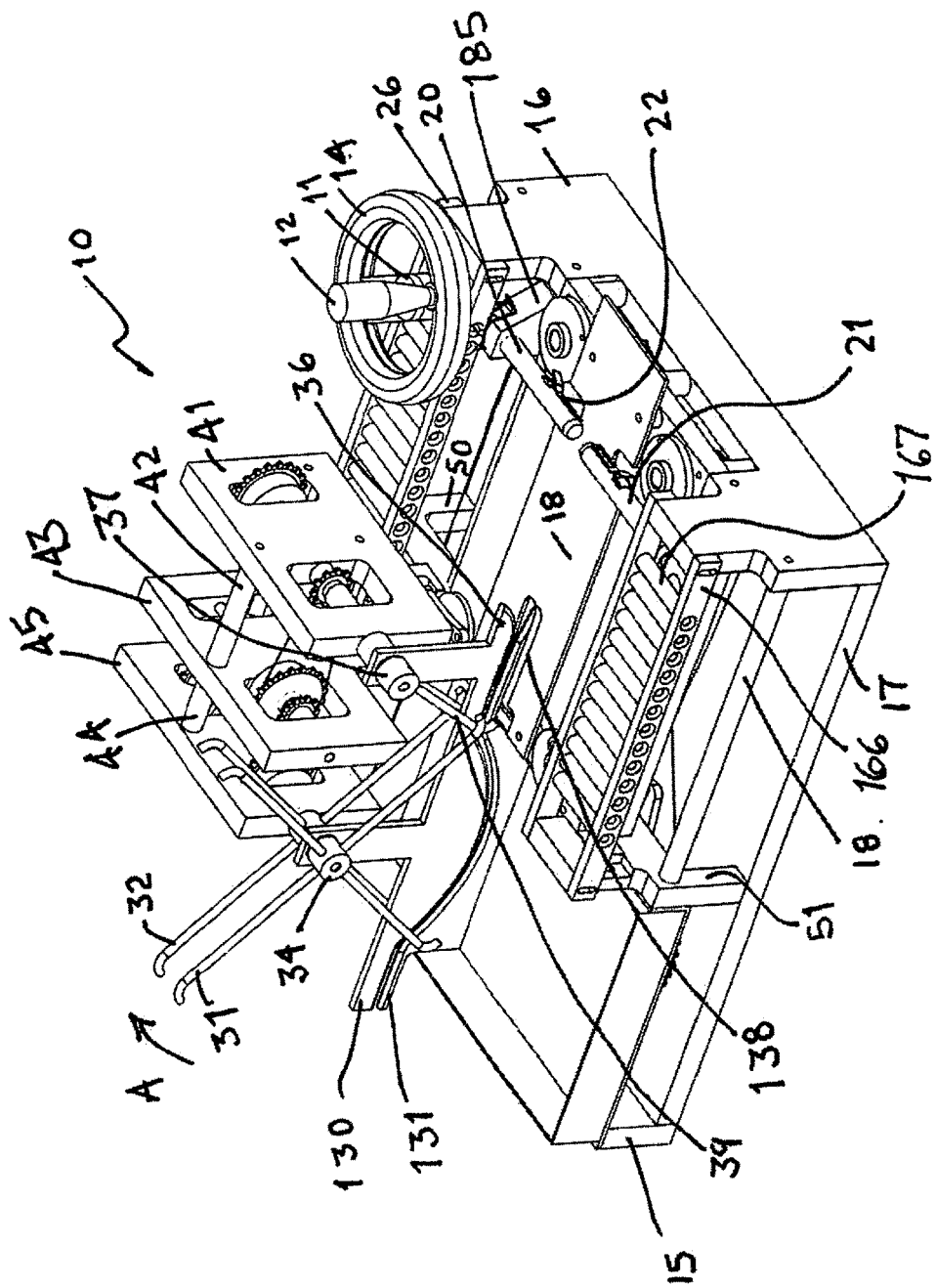
FIG. 1 illustrates an example of a machine for rolling, folding and forming of a confection.
Figure 2:
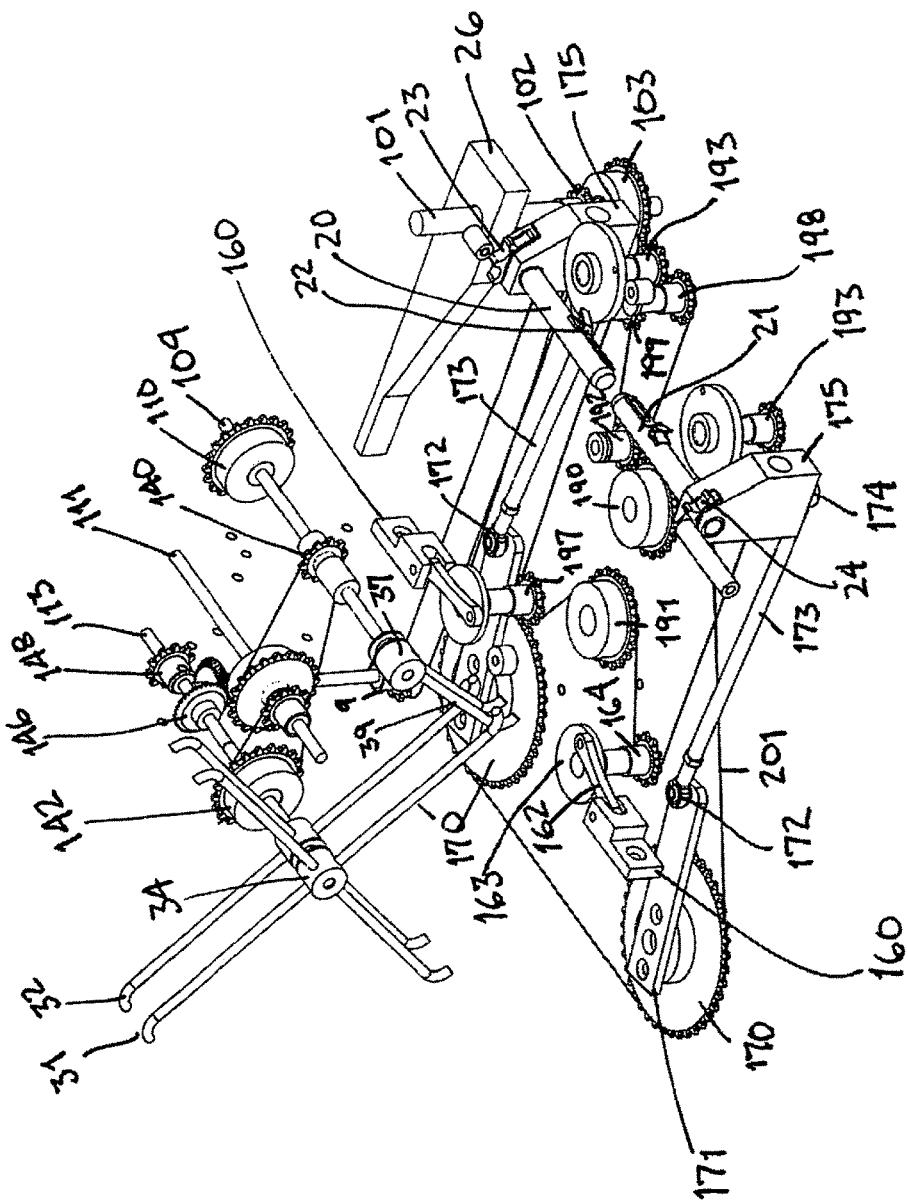
FIG. 2 illustrates a perspective view of gearing of the machine of FIG. 1, some of the structural features, such as the bottom, sides and plate being hidden from view for better observation of the gearing.

As illustrated in FIG. 1, for example, a hand crank 11, 12, 14 has a handle 12. The handle 12 may rotate a shaft 101 that rotatingly engages gearing of the machine 10, as illustrated in FIG. 2, for example. Alternatively, the hand crank may be replaced with an electric motor that rotates the shaft 101. The machine in FIG. 1 comprises structural elements, such as a front plate 16, a bar 18 coupling the front plate 16 to an intermediate support 50, 51, the intermediate support 51 and the from plate 16 supporting a pair of roller assemblies 166 on opposite sides of the machine 10. Each roller assembly has a plurality of rollers 167 capable of engaging a gear 23, 24 attached to cylindrical extensions 20 ,21, such that when the cylindrical extensions 20,21 are displaced, the gears 23, 24 engage the rollers 167, rotating the cylindrical extensions 20, 21.

In the example of FIG. 1, each cylindrical extension 20,21 has a gripping device 22. The gripping device may be biased closed, such as by a spring, such that a gentle gripping force is applied to a confection blank 1 placed on the plate 18 of the machine 10.

As the handle 12 is rotated, the gearing first causes the cylindrical extensions 20,21 to separate, without moving the cylindrical extensions 20,21 forward or back. This is achieved using a plurality of gear sets, each of the gears in a gear set being coupled, one to the other, by a chain, belt or other flexible connecting device, each such chain represented by a solid black line 201 in the drawings of FIGS. 1-5, for example.

Figure 3:
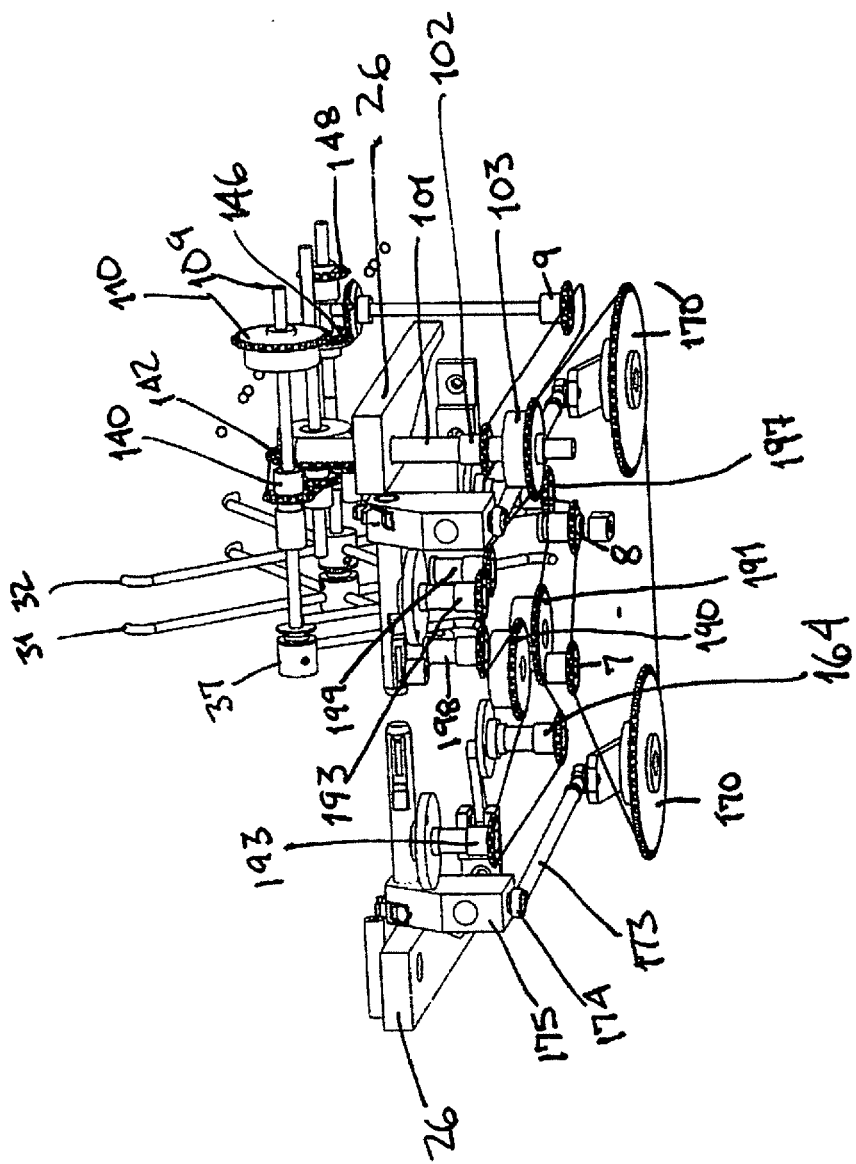
FIG. 3 illustrates another perspective view of the gearing of the machine of FIG. 1.
Figure 4:
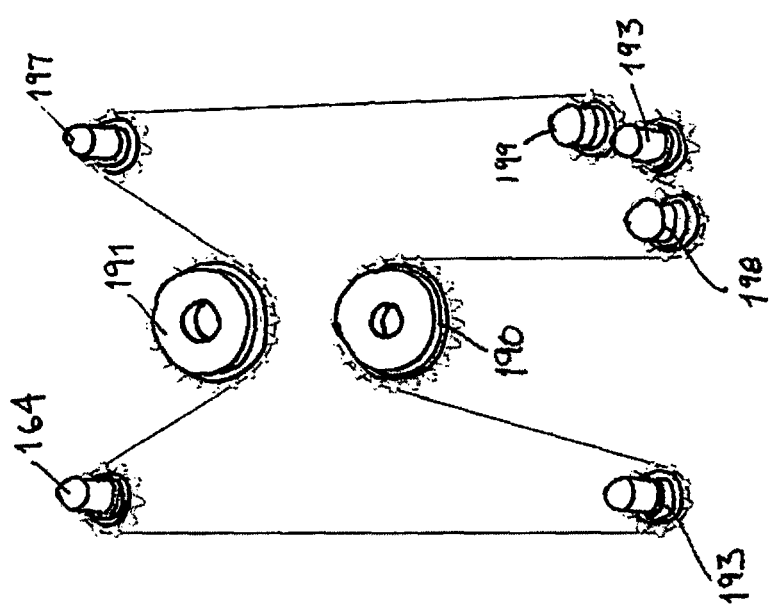
FIG. 4 illustrates a detail view of one set of the gearing of the machine of FIG. 1 with a solid line representing the chain connecting the set of gearing.

For example, the machine 10 of FIGS. 1-5 has a plurality of gear sets, one set 170, 7, 8, 103, 170' for moving the cylindrical extensions forward and back (SET FB), another set, 164, 193, 190, 198, 193, 199, 197,191, as illustrated in FIG. 4, for retracting the cylindrical extensions and returning the cylindrical extensions back toward a centerline of the plate 18 (SET RR), another set 102, 9, 146, 148, 110, 140, 142 for rotating pairs of fingers 31, 32, 39 that feed the confection through a forming device 130, 131 (SET RF) and another set 23, 24, 166 for rotating the cylindrical extensions 20, 21 (SET RCE). In this example, each of these sets of gears are actuated by rotation of the handle 12 attached to the shaft 101. Thus, rotation of a single shaft 101 drives all of the processes for rolling, folding and forming a confection blank 1.

In FIG. 1, gear support members 41, 43 and 45 are spaced apart by spacer bars 42, 44. Two of the support members 41, 45 engage respective supports extending upwardly from an upper portion 130 of the crimping device. Pairs of fingers 31, 32 extend from a hub 34 on either side of one of the supports extending from the upper portion 130 of the crimping device. A shaft engages the hub 34, rotating the hub 34 and the fingers 31, 32, when gear SET RF is engaged by rotating the shaft 101. In this example, a second pair of fingers 39 extends from a second hub 37, which engages the second support of the upper portion 130. A first pair of fingers 39 engages the rolled and folded confection, first, moving the confection through a first portion of the forming device 36, and then another pair of fingers 31, 32 engages the rolled, folded and formed confection to move the confection downwardly and forward through a tray, which may be filled with a hot liquid, such as hot water or oil, for example. As shown in FIG. 1, the pairs of fingers rotate in direction A, for example.

FIG. 2 is a similar view to FIG. 1, except some of the structural member are hidden to better show the gearing of the machine. For example, connector 160 is slidingly engaged with intermediate support 51, but is only partially visible in FIG. 1. The connector 160 is pivotally engaged to an arm 162, which is rotatingly engaged on disk 163, which is attached to a gear 164 by a shaft. The gear 164 is coupled, such as by a chain, represented by a solid line in the drawing, to gear SET RR.

Figure 5:
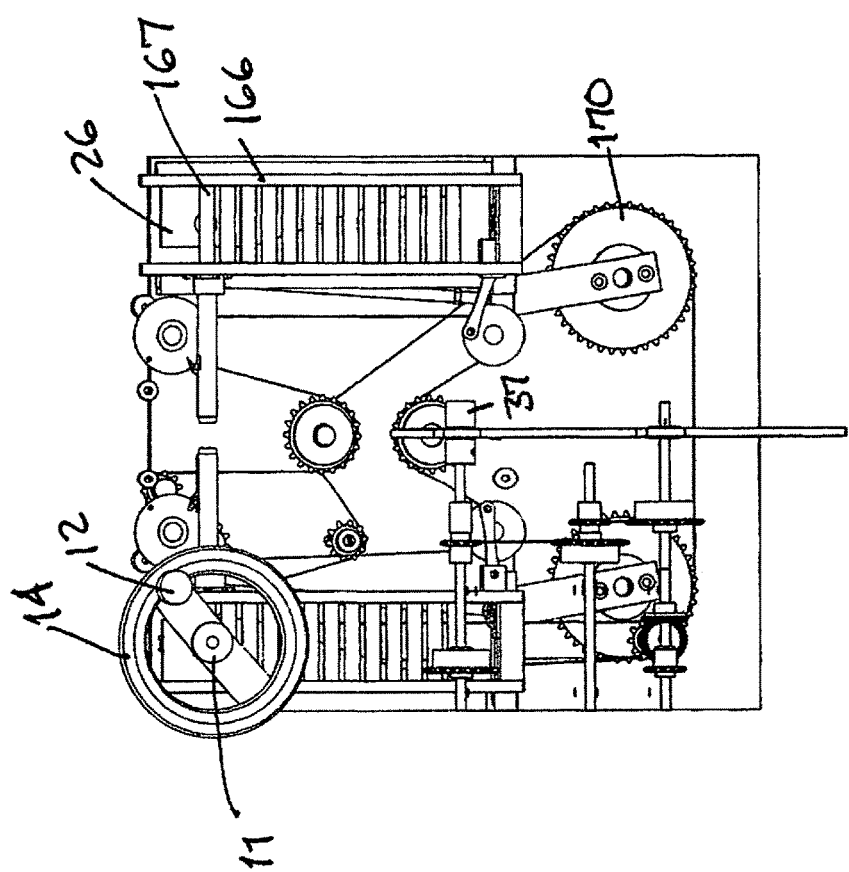
FIG. 5 illustrates a top plan view of the gearing and roller bars of the machine of FIG. 1.

FIG. 3 illustrates a different view than FIG. 2, but hides the same structural features for a better view of gear SET FB. In this view, an arm 173 is attached by joint 174 to a cylindrical extension support 175. Two cylindrical extension supports 175, both labeled 175, support each of the cylindrical extension 20, 21 and house a pair of gears 23, 24 attached to respective ones of the cylindrical extensions 20, 21. These gears 23, 24 engage rollers 167 of a pair of roller bars 166 positioned on opposite sides of the machine 10, as illustrated in FIG. 5, for example. The roller bars comprise a plurality of elongated rollers 167 that are capable of engaging the roller gears 23. 24 of the cylindrical extensions 20, 21 whether the cylindrical extensions are retracted from the centerline of the plate 18 or extending toward the centerline of the plate 18.

In operation, a blank 1 is placed on the plate 18, with one end, opposite of the direction of movement B, laying over slots formed in the plate 18. The cylindrical extensions 20, 21 are coupled with gearing SET RR. Then, the handle 12 is rotated, such that the cylindrical extensions 20,21 move toward each other, while an open gripping device 22 on each cylindrical extension is positioned on an opposite side of the blank 1 from the cylindrical extension 20, for example. Cut-outs on opposite sides of the plate 18 accommodate the positioning of the gripping device 22. The gripping device 22 may be biased by a spring such that it gently grips the blank 1 during the remainder of the processing. When the gear SET FB has rotated armature gears 170, 170' a specific rotational amount, the pair of arms 173 begin to engage the pair of extension supports 175 moving the cylindrical extensions forward. The roller gears 23, 24 then engage the rollers 167 of the roller bars 166, rolling up the blank 1, as the cylindrical extensions 20,21 rotate. The machine moves the extensions 20,21 forward and rotates the extensions, at the same time, rolling up the blank 1 and folding it over on itself. After the blank 1 is rolled up and folded onto itself, it is fed into a crimping device by a first pair of fingers 39. The confection may be fed into a tray for hot liquid for blanching, by a second pair of fingers 31, 32.

FIGS. 8-11 illustrate various plan views of a machine comprising a plurality of pairs of cylindrical extension members. For example, 12 pairs of cylindrical extension devices are arranged in a circuit, which increases productivity compared to a single pair of cylindrical extensions. The machine has a frame 320 that supports the machine 300. A pan 310 may be used for boiling water or oil to boil or fry a confection, at least partially. The machine shown has two stages, a first stage 301 and a second stage 302. The first stage has guides 331, 341 and following cams 332 that can permit or prevent rotation of the cylindrical extensions of the cylindrical extension devices. A lower portion 322 of the second stage 302 directs products through the pan 310, which may be filled with boiling water or oil for at least partially frying or boiling the products.

Figure 12:
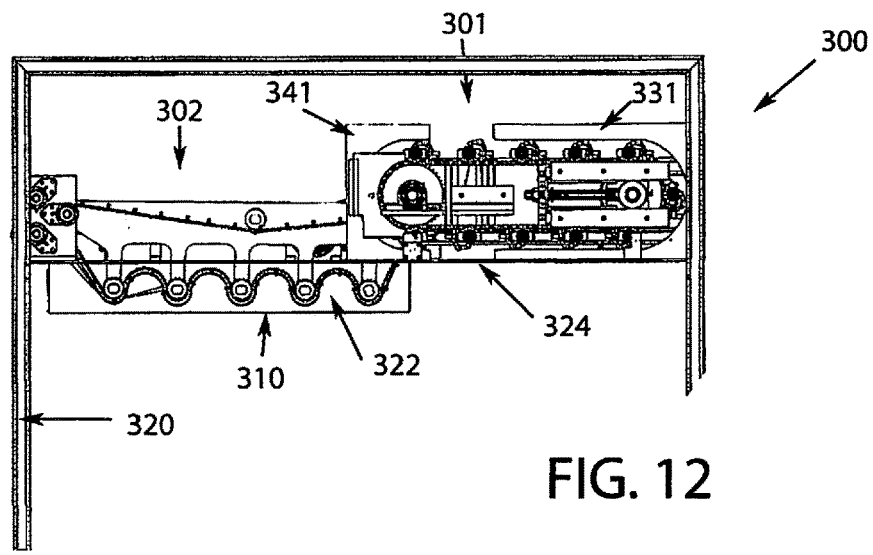
FIG. 12 illustrates the side view of FIG. 11 with some obscuring support structures hidden for clarity.
Figure 13:
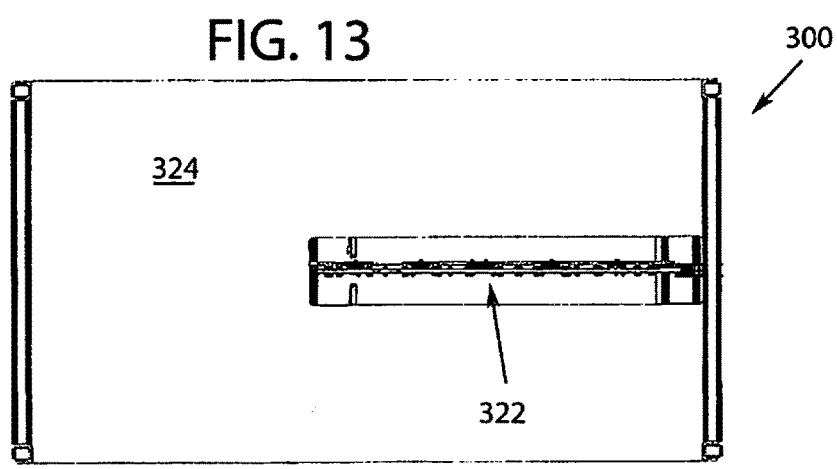
FIG. 13 illustrates a bottom view with the pan containing hot oil remove.
Figure 14:
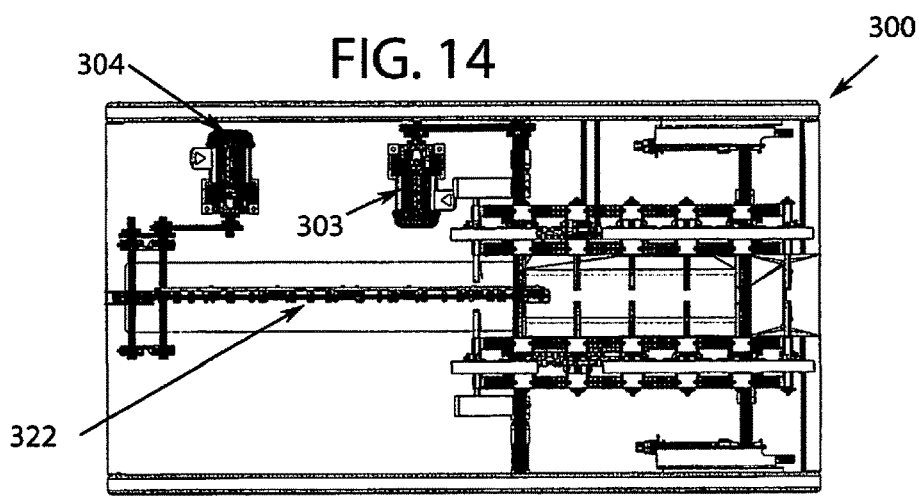
FIG. 14 illustrates a top view of the example shown in FIGS. 8-13.
Figure 15:
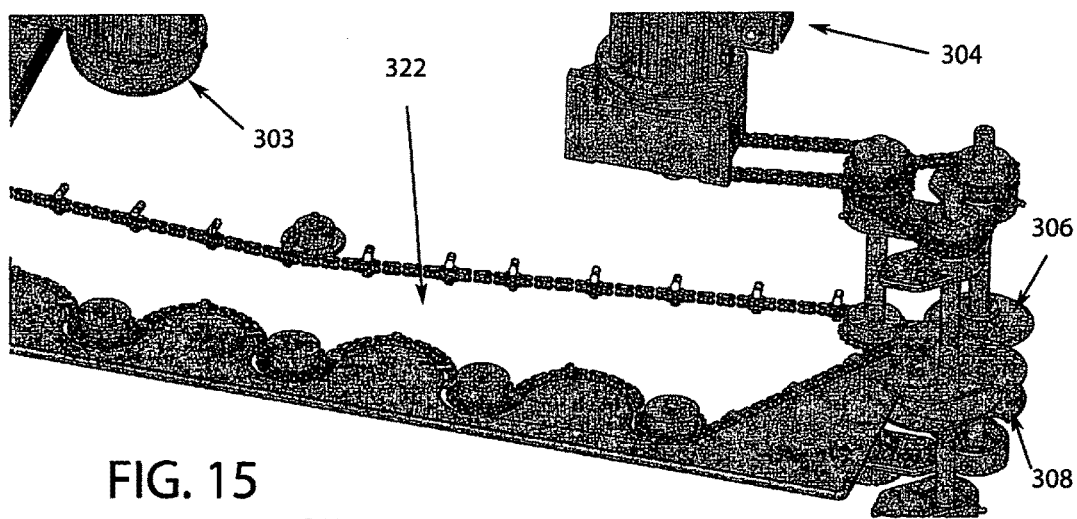
FIG. 15 illustrates a detail view of a portion of the second stage of the example in FIGS. 8-14.
Figure 16:
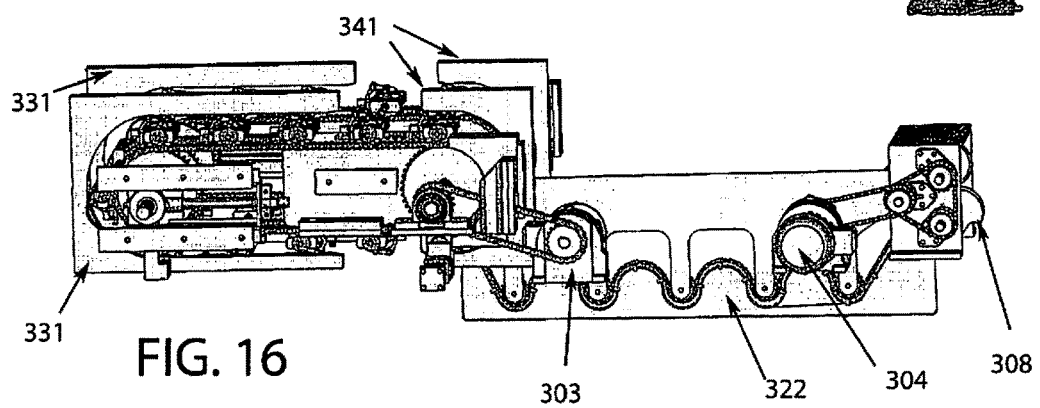
FIG. 16 illustrates a detail view of the machine with hidden surfaces removed, showing more detail about the drive mechanisms of this example.
Figure 17:
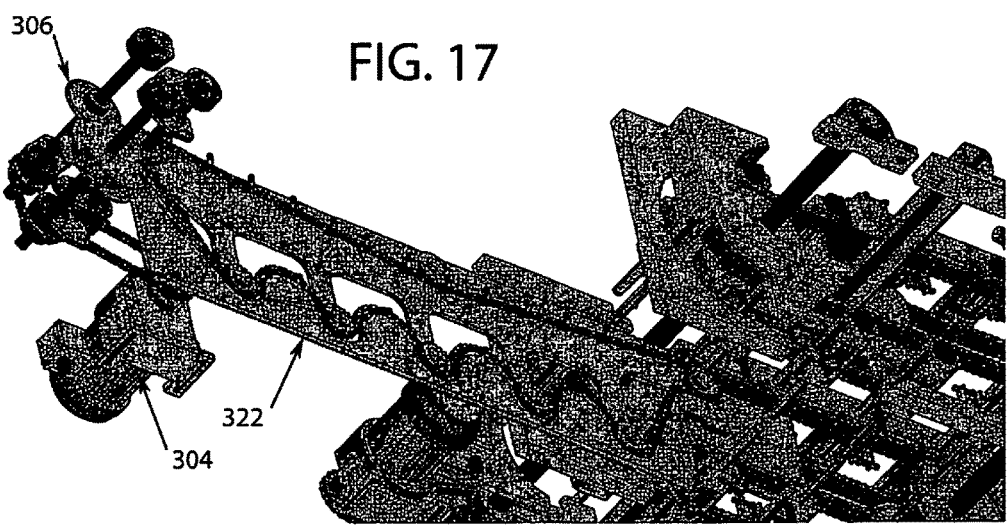
FIG. 17 illustrates a bottom, perspective view of a detail of the second stage of a machine.

Some hidden structures are removed in FIGS. 12-14 to provide alternative views of the machine. In these views, the location of two drive motors 303, 304 is shown, and the location of a plate 324 is identified. FIGS. 15-17 illustrate some details of the second stage 302 and its relationship with the first stage 301. A circular cutting blade 306 is shown in relation to a pair of disks 308 for moving finished or semi-finished products to a subsequent stage for additional preparation or packaging, for example.

In the drawings of FIGS. 18-20, a top view of the chain drive system is shown. A chain tightening system 333 is illustrated and is detailed in FIG. 20. FIG. 20 shows a locking mechanism 337 for locking the adjustable length of the tightening mechanism using a locking nut. A slot in a bearing assembly 336 engages a track of a structural support 335. The bearing assembly 336 is shown engaging a axle of a rotatable axle in FIG. 19.

Figure 21:
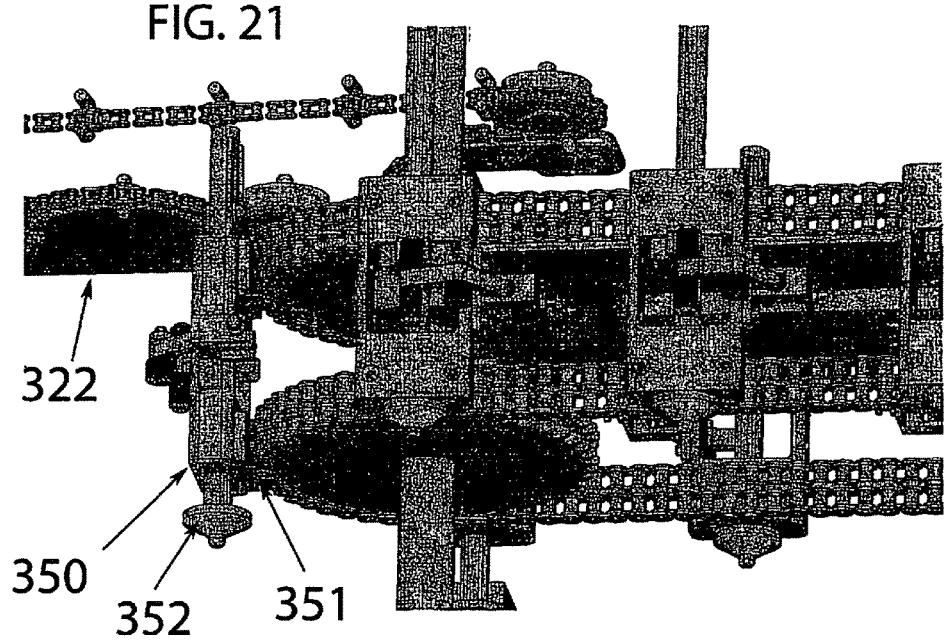
FIG. 21 illustrates a detail view of the attachment of cylindrical extension devices to chain drives of the first stage of a machine.
Figure 30:
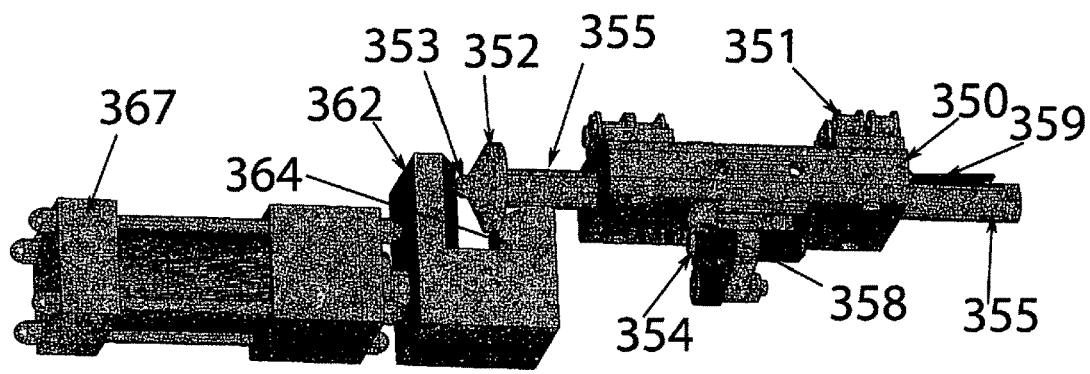
Figure 31:
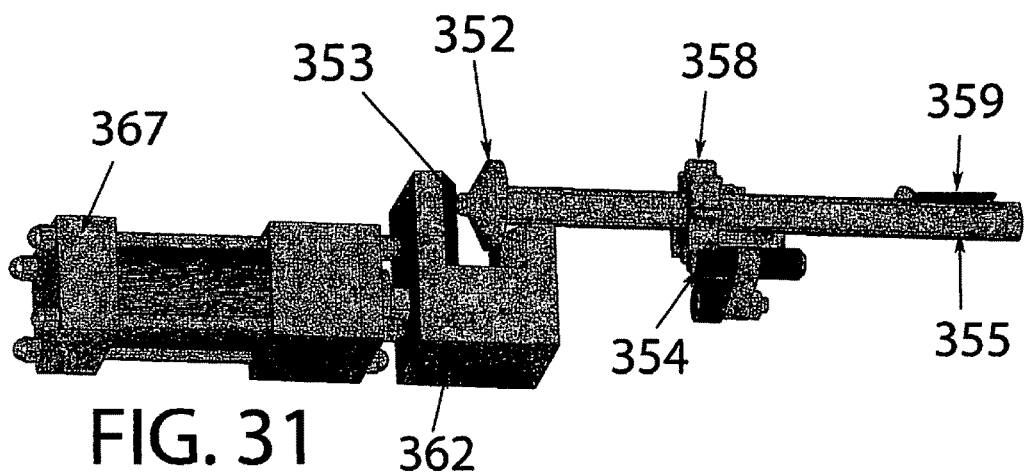

FIG. 21 illustrates a detailed view of the second stage 302. The sinusoidal/undulating path of the lower portion 322 of the second stage is designed to keep the product in the pan 310 for a longer duration than would be provided by a straighter path through the pan.

Figure 22:
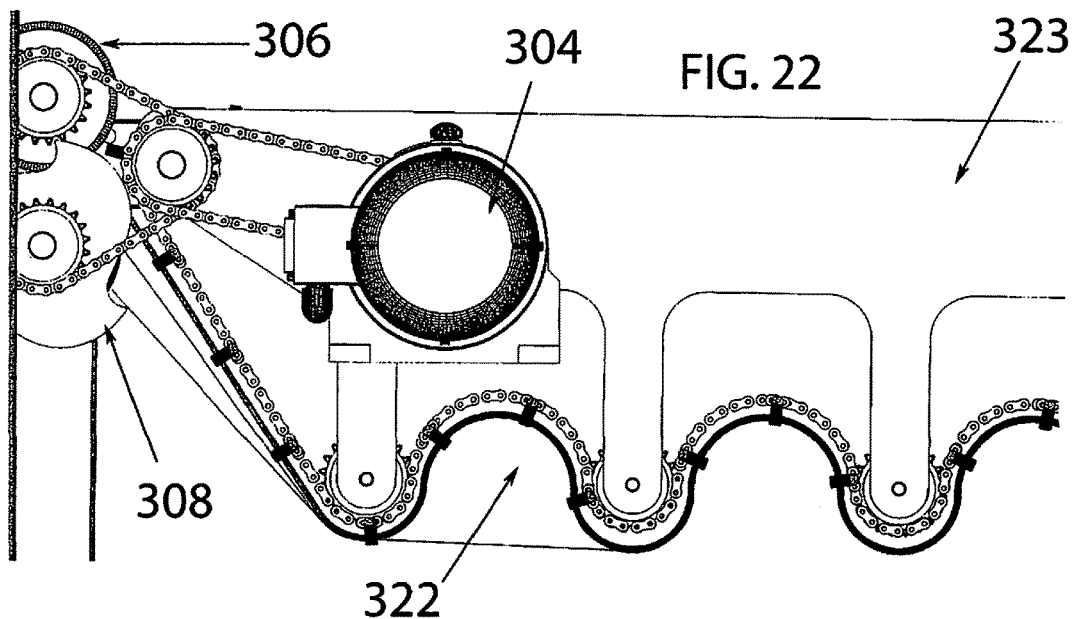
FIG. 22 illustrates a detail view of the second stage of a machine.

FIG. 22 illustrates a detailed view of a cylindrical extension device 350 having a shaped flange 352 coupled to the cylindrical extension and a pair of attachment points 351 that attach the device 350 to the chain drives of the first stage 301 of the machine 300. FIG. 23 illustrated a detail of a bottom view of the device 350 and shows the tip 353 of a push rod that opens the gripping member 359. The attachment points 351 are shown to include elongated pins that extend through the chain links and cotter pins that retain the elongated pins onto the attachment points 351, for example. FIGS. 24 and 25 illustrate detailed views of the cylindrical extension devices 350 mounted at attachment points 351 to the drive chains. FIG. 24 illustrates how a portion of the devices 350 engage with guides 331, 341 during a portion of the transit, such that the rotation of the cylindrical extensions is controlled. During a portion when the devices 350 do not engage the guides 331, 341, a row of pins engages with a gear in the devices 350, causing the blank to be rolled by the cylindrical extensions.

Figure 32:
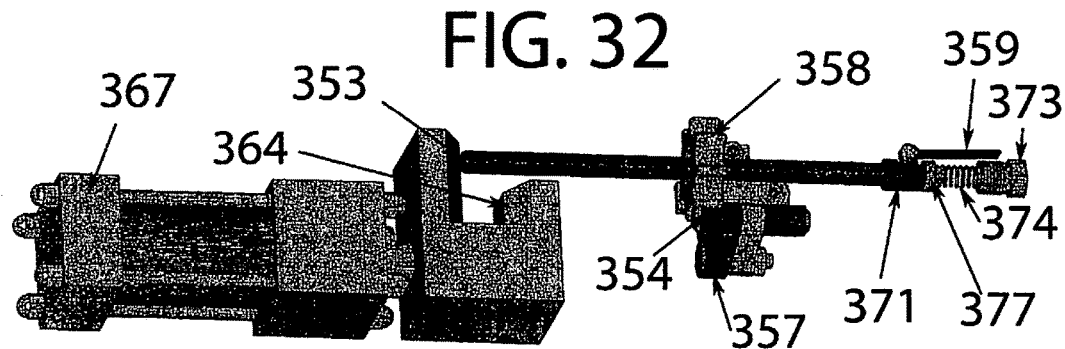
Figure 33:
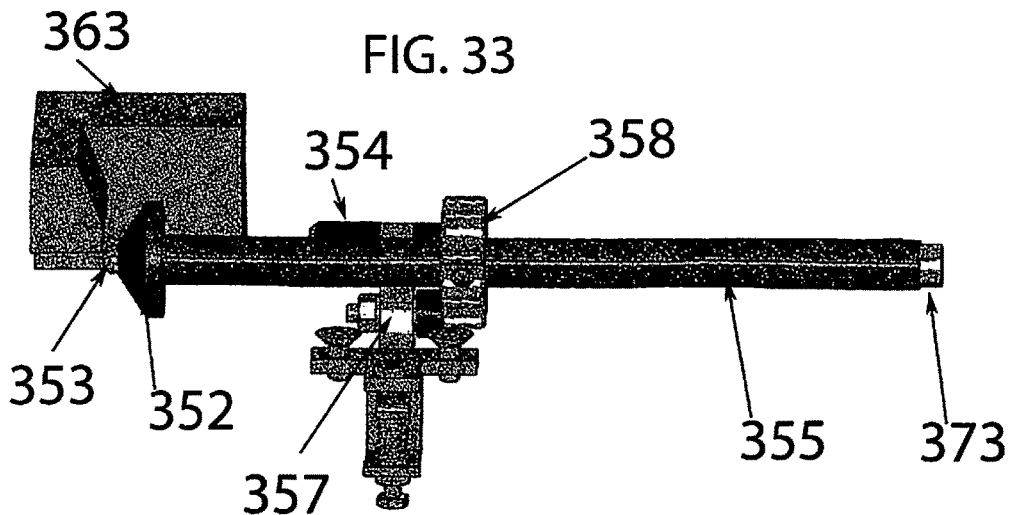
Figure 34:
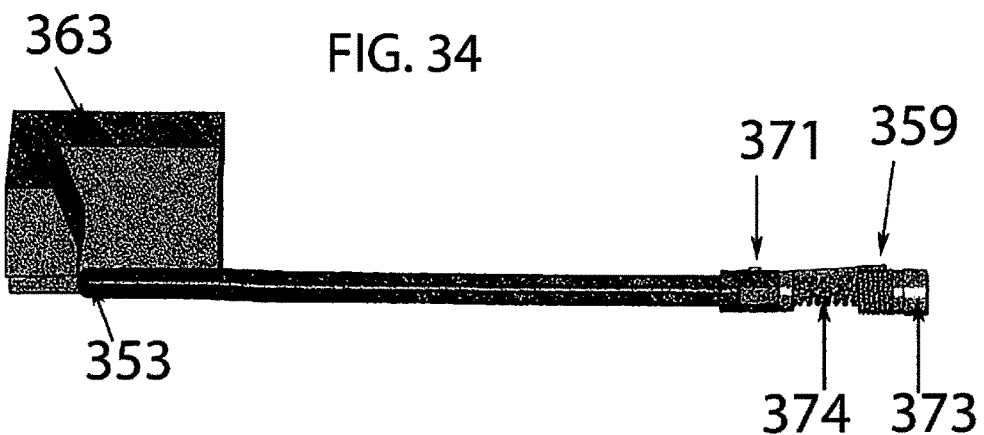
Figure 35:
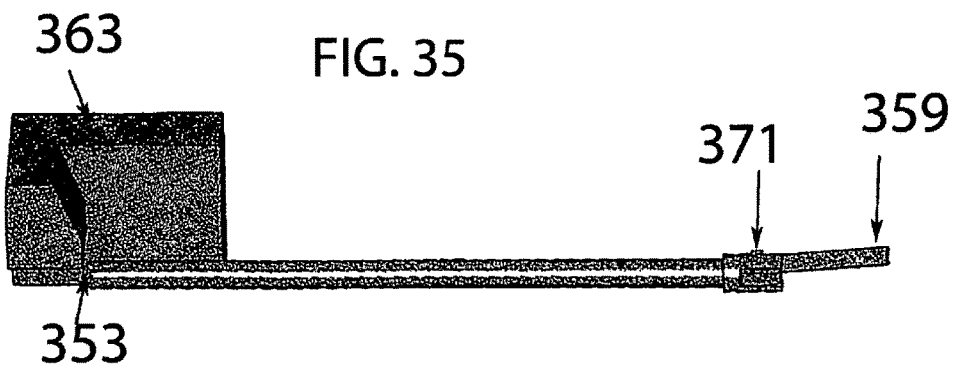

FIGS. 26 and 27 illustrate a how guides 362, 363 engage with the pin 353 and disk-shaped flange 352 to open the grabbing member 359 and retract the cylindrical extensions from the products after rolling of the products. FIGS. 28 and 29 show the guide followers 357 that follow guides 331, 341, retaining rocker arms and keeper 354 in a position that prevents rolling of the cylindrical extensions during a portion of the cycle. During another portion of the cycle, gear 358 engages pins 359. Gears 358 are fixed to the cylindrical extensions 355 causing the extensions 355 to rotated when engaged with the pins 359. Spring biased keepers 354 do not prevent rotation of the gears 358 during this portion of travel, and blanks are rolled up by the cylindrical extensions. FIGS. 30-35 step through several views removing certain structures in each view, such that the action of guides 362, 363 on the rod 353 and flange 352 is explained. The rod 353 is a spring 374 biased push rod that opens and closes gripping member 359. When it engages the guides, the rod 353 tip pushes a lever arm attached to the member 359 opening the member. The biasing mechanism 374 forces the gripping member 359 closed, otherwise, engaging anything, such as a blank, that is disposed between the gripping member 359 and the cylindrical extension 355. A sensor 367 (or alternatively a linear actuator) may be used to determine when the product is released by the extension 355. Another guide surface 364 engages the flange 352, which is fixedly coupled to the extension 355. Thus, the extension 355 is retracted from the rolled up blank when the flange 352 engages the guide 362 surface 364. An extension may be used to gradually return the extension 355 back to its neutral location, before completing the circuit and engaging another blank. The detailed view of FIG. 32 shows a housing 371 that may engage the pivot point of the rocker arm of the gripping member 359. A spring retainer 377 and end cap 373 retain a spring 374, as one example of a biasing mechanism. FIGS. 33-35 illustrate the mechanism that occurs when guide 363 engages the tip of the push rod 353, which opens the gripping member 359 to allow for engagement of the blank at the start of the extension devices 350 cycle.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A machine for automatically folding, rolling for forming a product from a flat blank to a rolled and formed product, comprising:
   a first stage comprised of a pair of extension devices, each of the extension devices having a gripping member and an elongated extension, the gripping member and the respective extension of a first one of the extension devices being arranged such that a portion of the blank is gripped between the gripping member and the extension of the first one of the extension devices and the gripping member and the respective extension of a second one of the extension devices being arranged such that a portion of the blank is gripped between the gripping member and the respective extension of the second one the pair of extension devices, and a distal end of the first one of the pair of extension devices opposes a distal end of the second one of the pair of extension devices, such that tae pair of extension devices grip opposite portions of the blank; and
   a drive, the drive comprising a mechanism for opening and closing the gripping member of each of the extension devices in relation to the extension of the same one of the pair of extension devices and a belt or chain, the pair of extension devices being coupled to the belt or chain, such that each of the pair of extension devices cycles from a starting position to a finishing position and returns again to the starting position, wherein the drive includes at least one guide arranged to retract at least a portion of the respective extension from the rolled and formed product, releasing the rolled and formed product for further processing, and the drive includes a rotary drive, the rotary drive engaging the pair of extensions during a portion of each cycle, such that the pair of extensions roll up the blank, wherein the mechanism for opening and closing the gripping member in relation to the respective extension comprises a push rod and a lever arm, wherein the gripping member is fixedly coupled to lever arm, such that when the push rod pushes a portion the lever arm, the lever arm pivots about a pivot point, opening the gripping member in relation to the respective extension; and
   the push rod extends through a flange and extends beyond the flange, and the at least one guide engages each of the respective push rods of the pair of extension devices, such that the respective gripping member opens in relation to the respective extension, before the gripping member grips the blank and before the pair of extensions retract from the rolled product.

2. The machine of claim 1, further comprising a second stage, wherein the second stage comprises a crimping device that engages the rolled and formed product and crimps a portion of the product, the crimped portion being secured while the product is fed into a cooker, the cooker supplying heat to a least partially cook the product before exiting the cooker, such that the product substantially retains its shape and is crimped.

3. The machine of claim 2, wherein the second stage further comprises a cutter, the cutter being arranged such that the product is divided into two products after crimping.

4. The machine of claim 3, wherein a rotating shaft drives the crimping device and the cutter.

5. The machine of claim 4, wherein the second stage further comprises an ejector, wherein the ejector pushes the two products from the second stage to a subsequent stage for further processing or packaging.

6. The machine of claim 1, wherein the drive comprises a rotating shaft that drives gears.

7. The machine of claim 6, wherein the gears are coupled with a chain, and the pair of extension devices are attached to the chain, such that the chain carries the pair of extension devices through each cycle.

8. The machine of claim 1, further comprising a second stage, wherein the second stage comprises a crimping device that engages the rolled and formed product and crimps a portion of the product, the crimped portion being secured while the product is fed into a cooker, the cooker supplying heat to at least partially cook the product before exiting the cooker, such that the product substantially retains its shape and is crimped.

9. The machine of claim 8, wherein the second stage further comprises a cutter, the cutter being arranged such that the product is divided into two products after crimping.

10. The machine of claim 9, wherein a rotating shaft drives the crimping device and the cutter.

11. The machine of claim 10, wherein the second stage further comprises an ejector, wherein the ejector pushes the two products from the second stage to a subsequent stage for further processing or packaging.

12. The machine of claim 11, wherein the crimping device comprises a chain, and the chain contacts the product, crimping the portion of the product.

13. The machine of claim 12, wherein an undulating plate opposes the chain on an opposite side of the crimped portion of the product.

\* \* \* \* \*